United States Patent
Groeschel et al.

(10) Patent No.: US 7,735,380 B2
(45) Date of Patent: Jun. 15, 2010

(54) METHOD AND SYSTEM OF COORDINATION OF MEASUREMENT SUBSYSTEMS OF A FLOW METER

(75) Inventors: Keith V. Groeschel, Houston, TX (US); Henry Charles Straub, Jr., Sugar Land, TX (US)

(73) Assignee: Daniel Measurement & Control, Inc., Houston, TX (US)

( * ) Notice: Subject to any disclaimer, the term of this patent is extended or adjusted under 35 U.S.C. 154(b) by 110 days.

(21) Appl. No.: 12/169,678

(22) Filed: Jul. 9, 2008

(65) Prior Publication Data

US 2010/0005901 A1   Jan. 14, 2010

(51) Int. Cl.
  *G01F 1/66*   (2006.01)
(52) U.S. Cl. .................................. 73/861.27
(58) Field of Classification Search .............. 73/861.27, 73/861.29, 861.04, 861.28
See application file for complete search history.

(56) References Cited

U.S. PATENT DOCUMENTS

| | | | |
|---|---|---|---|
| 2,993,373 A | | 7/1961 | Kritz |
| 3,564,912 A | | 2/1971 | Malone |
| 3,625,057 A | | 12/1971 | Yoshiyama |
| 3,940,985 A | | 3/1976 | Wyler |
| 4,102,186 A | * | 7/1978 | Brown ..................... 73/861.27 |
| 4,320,666 A | * | 3/1982 | Redding .................. 73/861.28 |
| 4,408,589 A | | 10/1983 | Hauler |
| 4,646,575 A | | 3/1987 | O'Hair |
| 5,040,415 A | | 8/1991 | Barkhoudarian |
| 5,228,347 A | * | 7/1993 | Lowell et al. ............ 73/861.28 |
| 5,369,998 A | * | 12/1994 | Sowerby .................. 73/861.04 |
| 5,437,194 A | * | 8/1995 | Lynnworth ............... 73/861.27 |
| 5,597,962 A | * | 1/1997 | Hastings et al. .......... 73/861.29 |
| 5,962,790 A | | 10/1999 | Lynnworth et al. |
| 6,089,104 A | * | 7/2000 | Chang ..................... 73/861.27 |

(Continued)

FOREIGN PATENT DOCUMENTS

JP    55-39035 A    3/1980

(Continued)

OTHER PUBLICATIONS

Internationl Search Report for PCT Patent Application No. PCT/US2009/046711 filed Jun. 9, 2009.

(Continued)

*Primary Examiner*—Jewel Thompson
(74) *Attorney, Agent, or Firm*—Mark E. Scott; Conley Rose, P.C.

(57) ABSTRACT

Coordination of measurement subsystems of a flow meter. At least some of the illustrative embodiments are flow meters comprising a spool piece that defines a central passage, a first plurality of transducer pairs mechanically coupled to the spool piece, a first control electronics electrically coupled to the first plurality of transducer pairs (the first control electronics configured to selectively activate each transducer pair of the first plurality of transducer pairs), a second plurality of transducer pairs mechanically coupled to the spool piece, a second control electronics different than the first control electronics (the second control electronics electrically coupled to the second plurality of transducer pairs, the second control electronics configured to selectively activate each transducer pair of the second plurality of transducer pairs). The first and second control electronics communicatively coupled and configured to coordinate activation of their respective transducer pairs.

20 Claims, 9 Drawing Sheets

U.S. PATENT DOCUMENTS

| | | | |
|---|---|---|---|
| 6,435,037 B1 | 8/2002 | Doten | |
| 6,435,038 B1 * | 8/2002 | Nam | 73/861.27 |
| 6,460,419 B2 * | 10/2002 | Su | 73/861.31 |
| 6,550,345 B1 * | 4/2003 | Letton | 73/861.27 |
| 6,595,071 B1 | 7/2003 | Doten | |
| 6,732,595 B2 * | 5/2004 | Lynnworth | 73/861.27 |
| 7,152,490 B1 * | 12/2006 | Freund et al. | 73/861.27 |
| 7,290,456 B2 | 11/2007 | Groeschel | |
| 2002/0053243 A1 | 5/2002 | Su | |
| 2010/0005900 A1 | 1/2010 | Straub | |

FOREIGN PATENT DOCUMENTS

| | | | |
|---|---|---|---|
| JP | 59-104026 U | 7/1984 | |
| JP | 8-304435 A | 11/1996 | |

OTHER PUBLICATIONS

Gregor Brown, Herb Estrada, Don Augenstein, Terry Cousins, LNG Allocation Metering Using 8-Path Ultrasonic Meters; 25th North Sea Flow Measurement Workshop, Oct. 16-19, 2007.

Dr. Volker Herrmann, John Lansing, Toralf Dietz, Steve Caldwell, Investigations of an 8-Path Ultrasound Meter—What Sensitivity to Upstream Disturbances Remain? 6th South East Asia Hydrocarbon Flow Measurement Workshop, 2007.

International Search Report for PCT Patent Application No. PCT/US2008/046752 filed Jun. 9, 2009.

PTO Office Action dated Dec. 24, 2009 filed in U.S. Appl. No. 12/169,685 filed Jul. 9, 2008.

Response to Office Action dated Dec. 24, 2009 for U.S. Appl. No. 12/169,685 filed Jul. 9, 2008.

PTO Notice of Allowance dated Apr. 9, 2010 for U.S. Appl. No. 12/169,685 filed Jul. 9, 2008.

* cited by examiner

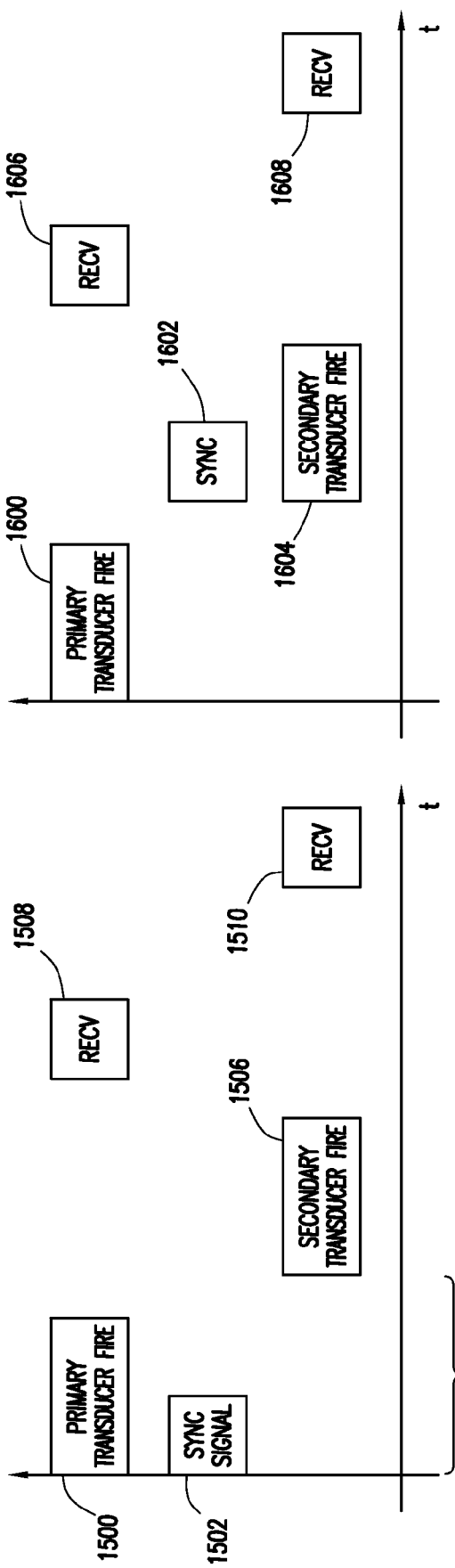
FIG. 15
FIG. 16
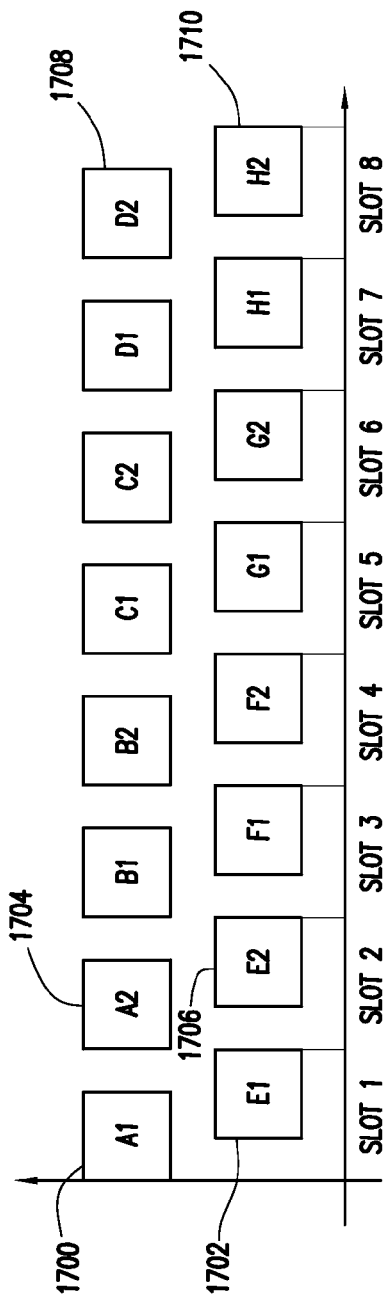
FIG. 17

US 7,735,380 B2

METHOD AND SYSTEM OF COORDINATION OF MEASUREMENT SUBSYSTEMS OF A FLOW METER

CROSS REFERENCE TO RELATED APPLICATIONS

None.

BACKGROUND

After hydrocarbons have been removed from the ground, the fluid stream (e.g., crude oil, natural gas) is transported from place-to-place via pipelines. It is desirable to know with accuracy the amount of fluid flowing in the stream, and particular accuracy is demanded when the fluid is changing hands, or "custody transfer." Ultrasonic flow meters may be used to measure the amount of fluid flowing in a pipeline, and ultrasonic flow meters have sufficient accuracy to be used in custody transfer.

The value of gas "changing hands" at the point of custody transfer in a high volume natural gas pipeline may amount to a million dollars or more in a single day. Thus, in some custody transfer situations a single meter body houses two independent ultrasonic flow meters. Two meters enable redundancy in case one meter fails, and in situations where both flow meters are operational, the accuracy of recorded flow volumes may be verified by comparing the two independent measurements. However, having two independent ultrasonic flow meters on the same meter body may create difficulties in operation and/or measurement by the meters.

BRIEF DESCRIPTION OF THE DRAWINGS

For a detailed description of exemplary embodiments, reference will now be made to the accompanying drawings in which:

FIG. 15 shows a timing diagram in accordance with at least some embodiments;

FIG. 16 shows a timing diagram in accordance with at least some embodiments;

FIG. 17 shows a timing diagram in accordance with at least some embodiments.

NOTATION AND NOMENCLATURE

Certain terms are used throughout the following description and claims to refer to particular system components. As one skilled in the art will appreciate, meter manufacturing companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . ." Also, the term "couple" or "couples" is intended to mean either an indirect or direct connection. Thus, if a first device couples to a second device, that connection may be through a direct connection, or through an indirect connection via other devices and connections.

"Spool piece" and/or "meter body" shall refer to a component milled from a single casting. A spool piece and/or meter body created from separate castings coupled together (e.g., flange connection, welded) shall not be considered a "spool piece" or "meter body" for purposes of this disclosure and claims.

"Activation" in reference to a transducer pair shall mean one or both of: launching of an acoustic signal by a first transducer of the transducer pair; and receipt of the acoustic signal by a second transducer of the transducer pair.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment. Further, the various embodiments were developed in the context of measuring hydrocarbon flows (e.g., crude oil, natural gas), and the description follows from the developmental context; however, the systems and methods described are equally applicable to measurement of any fluid flow (e.g., cryogenic substances, water).

Figure 1:
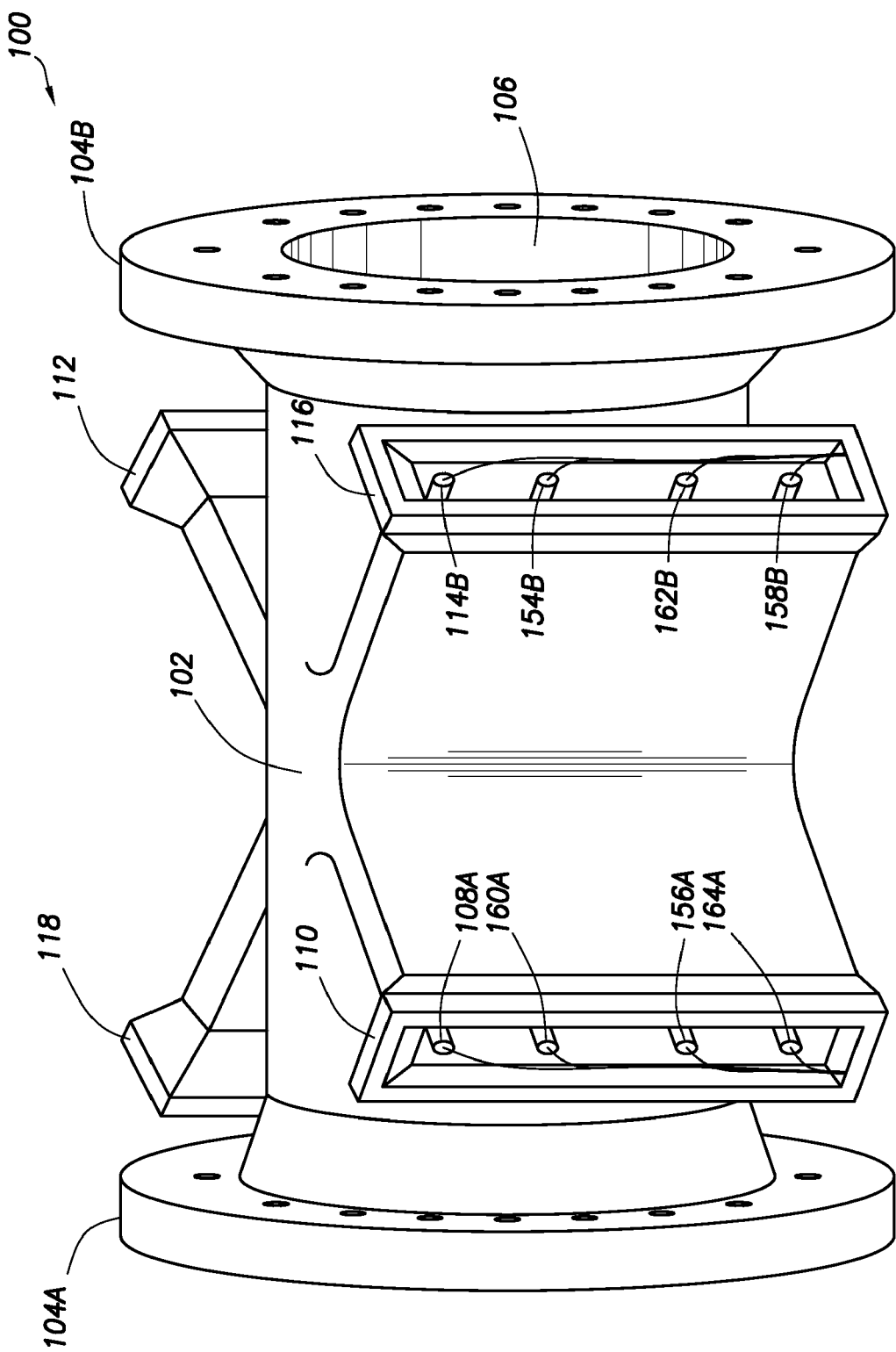
FIG. 1 shows a perspective view of a flow meter in accordance with at least some embodiments.

FIG. 1 illustrates a perspective view of flow meter 100 comprising a sufficient number of transducer pairs that redundant flow measurements can be made. In particular, the meter body or spool piece 102 is configured for placement between sections of a pipeline, such as by connecting the spool piece 102 to the pipeline by way of the flanges 104. The spool piece 102 has a predetermined size and defines a central passage 106 through which measured fluid flows. The flow meter 100 further comprises a plurality of transducer pairs. In the perspective view of FIG. 1, only one transducer of each of the illustrative eight transducer pairs is visible. In particular, transducer 108 in housing 110 is paired with a transducer (not visible) in housing 112. Likewise, the remaining transducers in housing 110 are paired with transducers (not visible) in housing 112. Similarly, transducer 114 in housing 116 is paired with a transducer (not visible) in housing 118. Likewise, the remaining transducers in housing 116 are paired with transducers (not visible) in housing 118.

Figure 2:
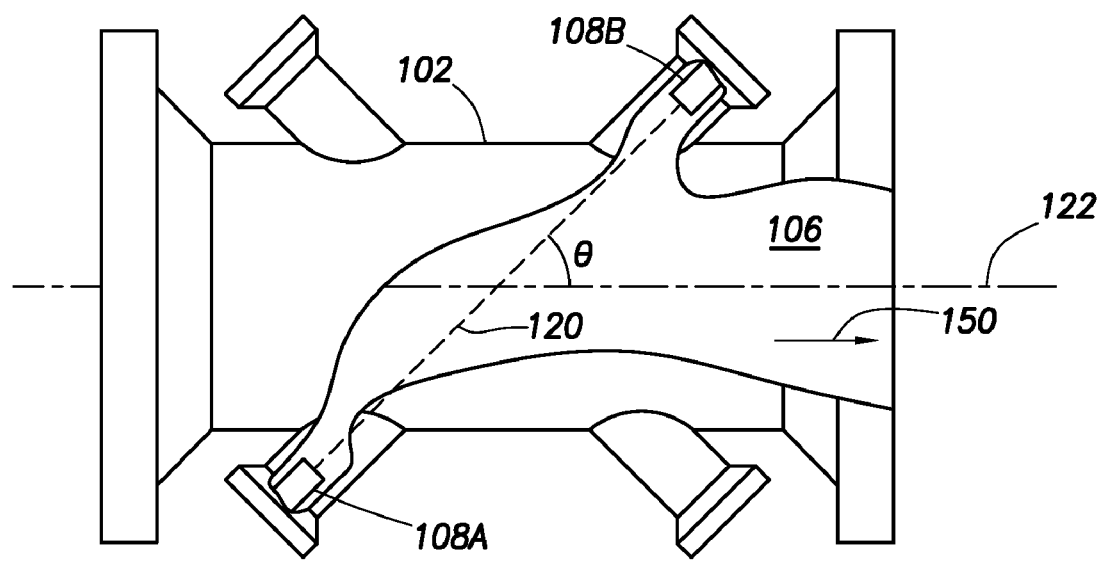
FIG. 2 shows an overhead, partial cut-away view of a flow meter in accordance with at least some embodiments.

FIG. 2 illustrates an overhead partial cut-away view of the system of FIG. 1. In particular, FIG. 2 shows that an illustrative pair of transducers 108A and 108B is located along the length of spool piece 102. Transducers 108A and 108B are acoustic transceivers, and more particularly ultrasonic transceivers, meaning that they both generate and receive acoustic energy having frequencies of above about 20 kilohertz. The acoustic energy is generated and received by a piezoelectric element in each transducer. To generate an acoustic signal, the piezoelectric element is stimulated electrically by way of a sinusoidal signal, and it responds by vibrating. The vibration of the piezoelectric element generates the acoustic signal that travels through the measured fluid in the central passage 106 to the corresponding transducer of the transducer pair. Similarly, upon being struck by acoustic energy (i.e., the acoustic signal and other noise signals) the receiving piezoelectric element vibrates and generates an electrical signal that is detected, digitized, and analyzed by electronics associated with the meter.

A path 120, sometimes referred to as a "chord" or a "chordal pathway", exists between illustrative transducers 108A and 108B at an angle θ to a centerline 122. The length of chord 120 is the distance between the face of transducer 108A and the face of transducer 108B. A fluid (e.g., crude oil, natural gas, liquefied natural gas) flows in a direction 150. Initially, downstream transducer 108B generates an acoustic signal that propagates across the fluid in the spool piece 102, and is then incident upon and detected by upstream transducer 108A. A short time later (e.g., within a few milliseconds), the upstream transducer 108A generates a return acoustic signal that propagates back across the fluid in the spool piece 102, and is then incident upon and detected by the downstream transducer 108B. Thus, illustrative transducers 108A and 108B play "pitch and catch" with acoustic signals along chordal path 120. During operation, this sequence may occur thousands of times per minute.

The transit time of the acoustic signal between transducers 108A and 108B depends in part upon whether the acoustic signal is traveling upstream or downstream with respect to the fluid flow. The transit time for an acoustic signal traveling downstream (i.e., in the same direction as the fluid flow, defined by arrow 150) is less than its transit time when traveling upstream (i.e., against the fluid flow, opposite the direction of arrow 150). The upstream and downstream transit times can be used to calculate the average flow velocity of the fluid along and/or proximate to the chord, and the transit times can be used to calculate speed of sound in the measured fluid.

In accordance with the various embodiments, the flow meter 100 performs two separate and independent flow measurements with transducers on the same spool piece. In particular, four of the illustrative eight transducer pairs are associated with a first flow measurement subsystem, and the remaining four of the illustrative eight transducer pairs are associated with a second flow measurement subsystem. In other embodiments, greater or fewer numbers of transducers pairs may be used by each measurement subsystem, and the number of transducers pairs as between the measurement subsystems need not be the same. Regardless of the number transducer pairs used by each measurement subsystem, when each flow measurement subsystem is in operation the separate flow measurements may be compared and thus used to verify fluid flow through the meter. In cases where one flow measurement subsystem is inoperable (e.g., a transducer pair fails), the second flow measurement subsystem may continue to be used for measuring the fluid flow.

Figure 3:
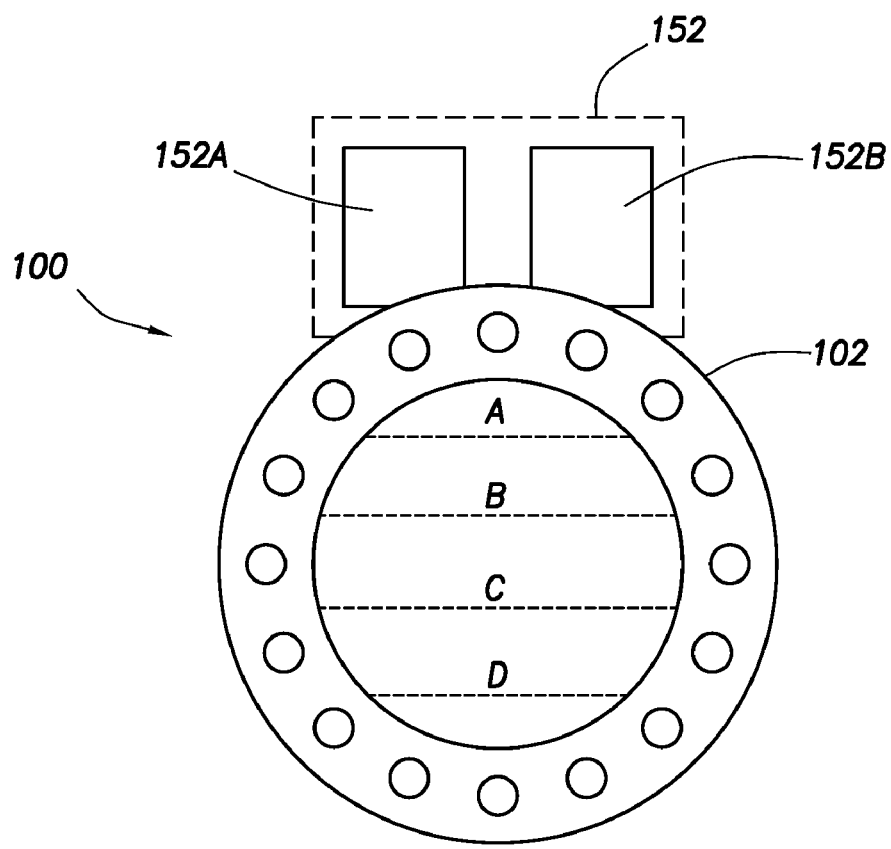
FIG. 3 shows an elevation end-view of a flow meter, and with respect to a first measurement subsystem, in accordance with at least some embodiments.

FIG. 3 illustrates an elevational end-view of one end of the flow meter 100 in relation to a first measurement subsystem. The first flow measurement subsystem of FIG. 3 comprises four chordal pathways A, B, C and D at varying elevations within the spool piece 102. In particular, chord A is an uppermost chord, chord B is an upper-middle chord, chord C is the lower-middle chord, and chord D is the lower-most chord. The elevation designations upper and lower, and the variants, are in reference to gravity. Each chordal pathway A-D corresponds to a transducer pair behaving alternately as a transmitter and receiver. Also shown in FIG. 3 is meter electronics 152 that acquire and process the data from the illustrative four chordal pathways A-D (and possibly others). Hidden from view in FIG. 3, because of the flange, are the four pairs of transducers that correspond to chordal pathways A-D. FIG. 3 shows only the elevational orientation of the illustrative four chords of the first measurement subsystem, and does not speak to whether those chords are parallel or co-planar.

Figure 4:
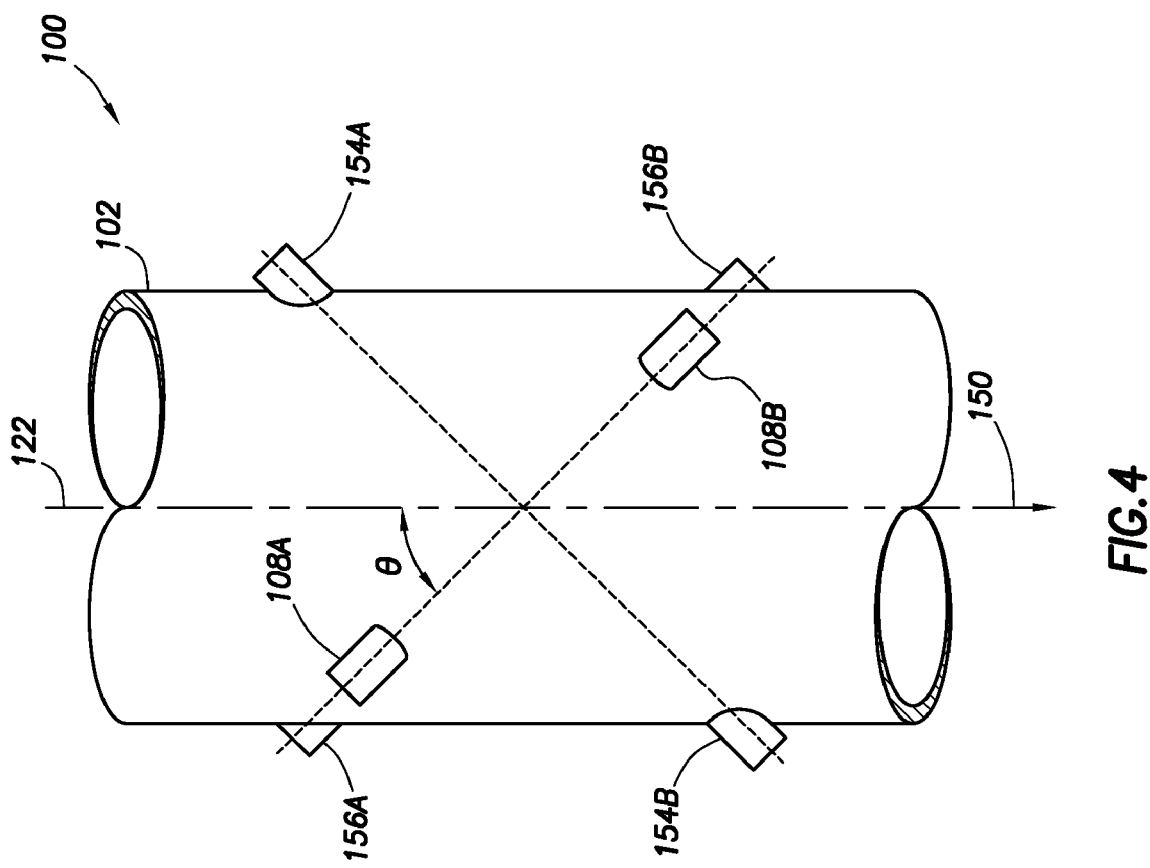
FIG. 4 shows an overhead view of a flow meter, and with respect to a first measurement subsystem, in accordance with at least some embodiments.

FIG. 4 shows an overhead view of the flow meter 100 (with the housings 110, 112, 116 and 118 not shown) to illustrate the relationships of the chords of a first measurement subsystem in accordance with at least some embodiments. In particular, a first pair of transducers 108A and 108B (which corresponds to the upper-most chord, chord A) defines a chordal pathway at a non-perpendicular angle θ to centerline 122 of spool piece 102. Another pair of transducers 154A and 154B (which corresponds to upper-middle chord, chord B) defines a chordal pathway that loosely forms the shape of an "X" with respect to the chordal pathway of transducers 108A and 108B, and in some embodiments the chordal pathway for transducers 154A and 154B is perpendicular to the chordal pathway for transducers 108A and 108B. Similarly, a third pair of transducer 156A and 156B (which corresponds to the lower-middle chord, chord C) defines a chordal pathway parallel to the chordal pathway for transducers 108A and 108B, but lower in the central passage than the chordal pathway for either transducers 108A and 108B or transducers 154A and 154B. Not explicitly shown in FIG. 4, because of the curvature of the illustrative spool piece 102, is a fourth pair of transducers 158 (transducer 158B shown in FIG. 1) (which corresponds to the lower-most chord, chord D) defines a chordal pathway parallel to the chordal pathway for transducer ports 154A and 154B.

Taking FIGS. 3 and 4 together, for the first illustrative measurement subsystem the pairs of transducers are arranged such that the upper two pairs of transducers corresponding to chords A and B form an the shape of an "X", and the lower two pairs of transducers corresponding to chords C and D also form the shape of an "X". Chords A and B are non-planar, chords C and D are non-planar, chords A and C are parallel, and chords B and D are parallel. Other arrangements of the chords are possible, such as all the chords for the measurement subsystem residing in the same vertical plane. The first measurement subsystem determines the velocity of the gas proximate to each chord A-D to obtain chordal flow velocities, and the chordal flow velocities are combined to determine an average flow velocity across the entire central passage. From the average flow velocity and the known cross-sectional area of the central passage, the amount of gas flowing in the spool piece, and thus the pipeline, may be determined by the first measurement system.

Figure 5:
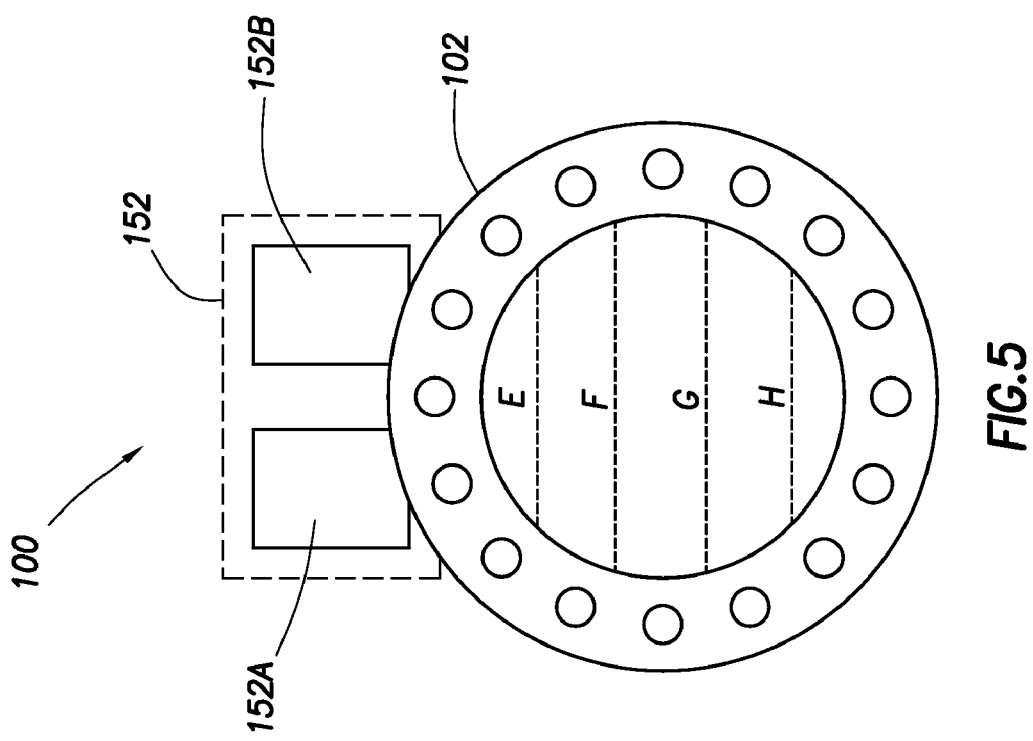
FIG. 5 shows an elevation end-view a flow meter, and with respect to a second measurement subsystem, in accordance with at least some embodiments.

Turning now to the second measurement subsystem, FIG. 5 illustrates an elevational end view of one end of the flow meter 100 in relation to a second measurement subsystem. The flow measurement subsystem of FIG. 5 comprises four chordal pathways E, F G and H at varying elevations within the spool piece 102. In particular, chord E is an upper-most chord, chord F is an upper-middle chord, chord G is the lower-middle chord, and chord H is the lower-most chord. Each chordal path E-H corresponds to a transducer pair behaving alternately as a transmitter and receiver. Also shown in FIG. 5 is the meter electronics 152 that acquire and process the data from the illustrative four chordal pathways E-H (and possibly others). Hidden from view in FIG. 5, because of the flange, are the four pairs of transducers that correspond to chordal pathways E-H. In accordance with at least some embodiments, the chords E-H are at the same elevations as chords A-D, respectively, while in other embodiments some or all of the chords E-H may be at different elevations than chords A-D. Moreover, FIG. 5 shows only the elevational orientation of the illustrative four chords of the second measurement subsystem, and does not speak to whether those chords are parallel or co-planar.

Figure 6:
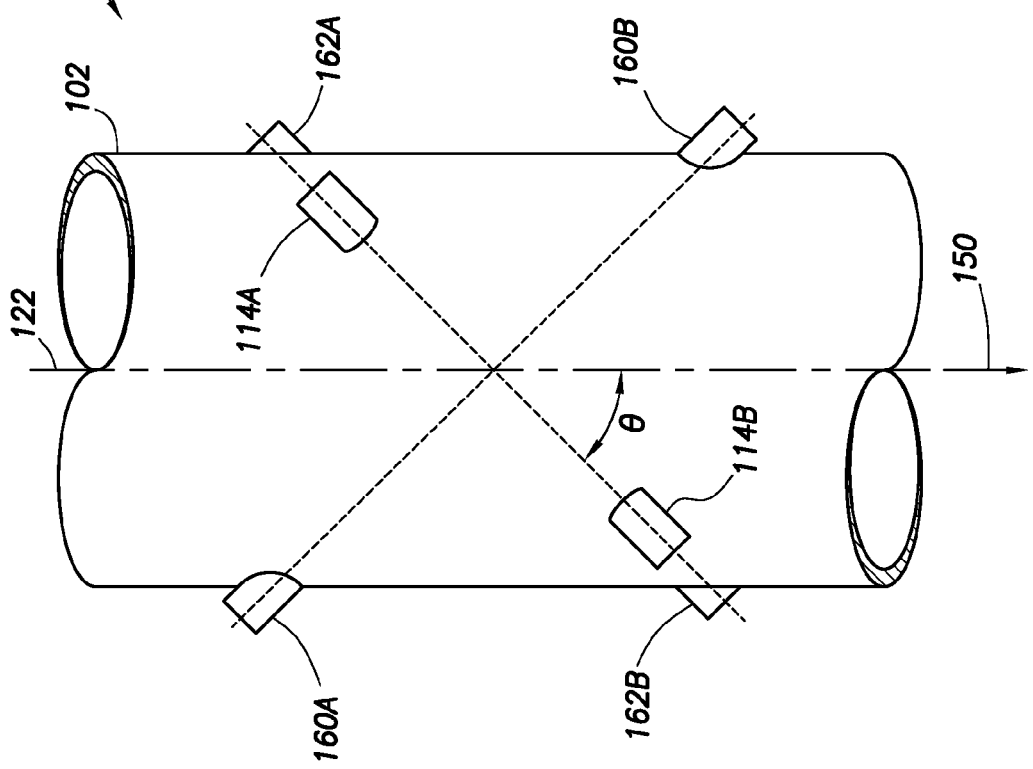
FIG. 6 shows an overhead view of a flow meter, and with respect to a second measurement subsystem, in accordance with at least some embodiments.

FIG. 6 shows an overhead view of the flow meter 100 (with the housings 110, 112, 116 and 118 not shown) to illustrate another aspect of the relationship of the chordal pathways used for the second illustrative flow measurement subsystem. In particular, a first pair of transducers 114A and 114B (which corresponds to the upper-most chord, chord E) defines a chordal pathway at a non-perpendicular angle θ to centerline 122 of spool piece 102. Another pair of transducers 160A and 160B (which corresponds to upper-middle chord, chord F) defines a chordal pathway that loosely forms the shape of an "X" with respect to the chordal pathway of transducers 114A and 114B. Similarly, a third pair of transducer 162A and 162B (which corresponds to the lower-middle chord, chord G) defines a chordal pathway parallel to the chordal pathway for transducers 114A and 114B, but lower in the central passage than the chordal pathway for either transducers 114A and 114B or transducers 160A and 160B. Not explicitly shown in FIG. 6, because of the curvature of the illustrative spool piece 102, is a fourth pair of transducers 164 (transducer 164A shown in FIG. 1) (which corresponds to the lower-most chord, chord H) that defines a chordal pathway parallel to the chordal pathway for transducer ports 160A and 160B.

Taking FIGS. 5 and 6 together, for the second illustrative measurement subsystem the pairs of transducers are arranged such that the upper two pairs of transducers corresponding to chords E and F form an the shape of an "X", and the lower two pairs of transducers corresponding to chords G and H also form the shape of an "X". Chords E and F are non-planar, chords G and H are non-planar, chords E and G are parallel, and chords F and H are parallel. Other arrangements of the chords are possible, such as all the chords residing in the same vertical plane. The second measurement subsystem determines the velocity of the gas proximate to each chord E-H to obtain chordal flow velocities, and the chordal flow velocities are combined to determine an average flow velocity across the entire central passage. From the average flow velocity and the known cross-sectional area of the central passage, the amount of gas flowing in the spool piece, and thus the pipeline, may be determined by the second measurement subsystem.

Figure 7:
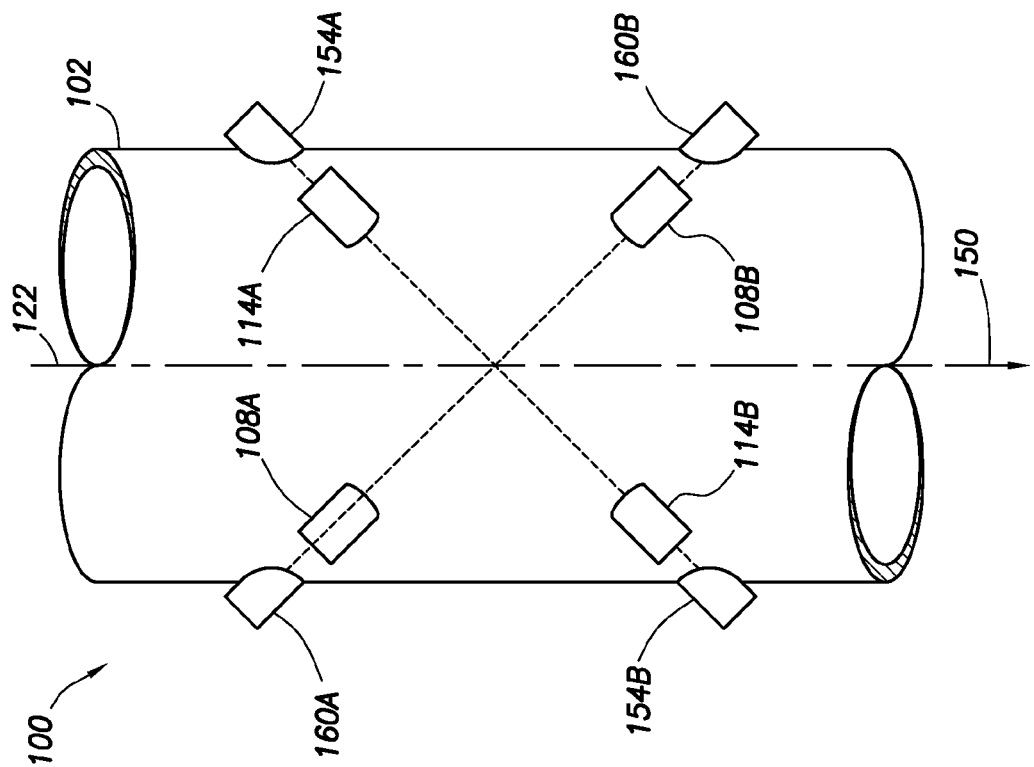
FIG. 7 shows an overhead view of a flow meter in accordance with at least some embodiments.

FIGS. 4 and 6 only show transducers associated with the measurement subsystem being described. FIG. 7 shows an overhead view of the flow meter 100 (with the housings 110, 112, 116 and 118 not shown) to illustrate the relationship of at least some the transducer pairs as between measurement subsystems, and in accordance with at least some embodiments.

In particular, the first measurement subsystem comprises transducer pair 108A and 108B, transducer pair 154A and 154B, and two other pairs not visible in FIG. 7. The second measurement subsystem comprises transducer pair 114A and 114B, transducer pair 160A and 160B, and two other pairs not visible in FIG. 7. Thus, in the embodiments shown in FIG. 7, the transducer pairs corresponding to the upper-most chords (chord A for the first measurement subsystem and E for the second measurement subsystem), are at the same axial position of the spool piece 102. Likewise, the transducer pairs corresponding to the upper-middle chords (chord B for the first measurement subsystem and F for the second measurement subsystem), are at the same axial position of the spool piece 102. However, other arrangements are possible, such as the second measurement subsystem being shifted axially along the spool piece 102.

Figure 8:
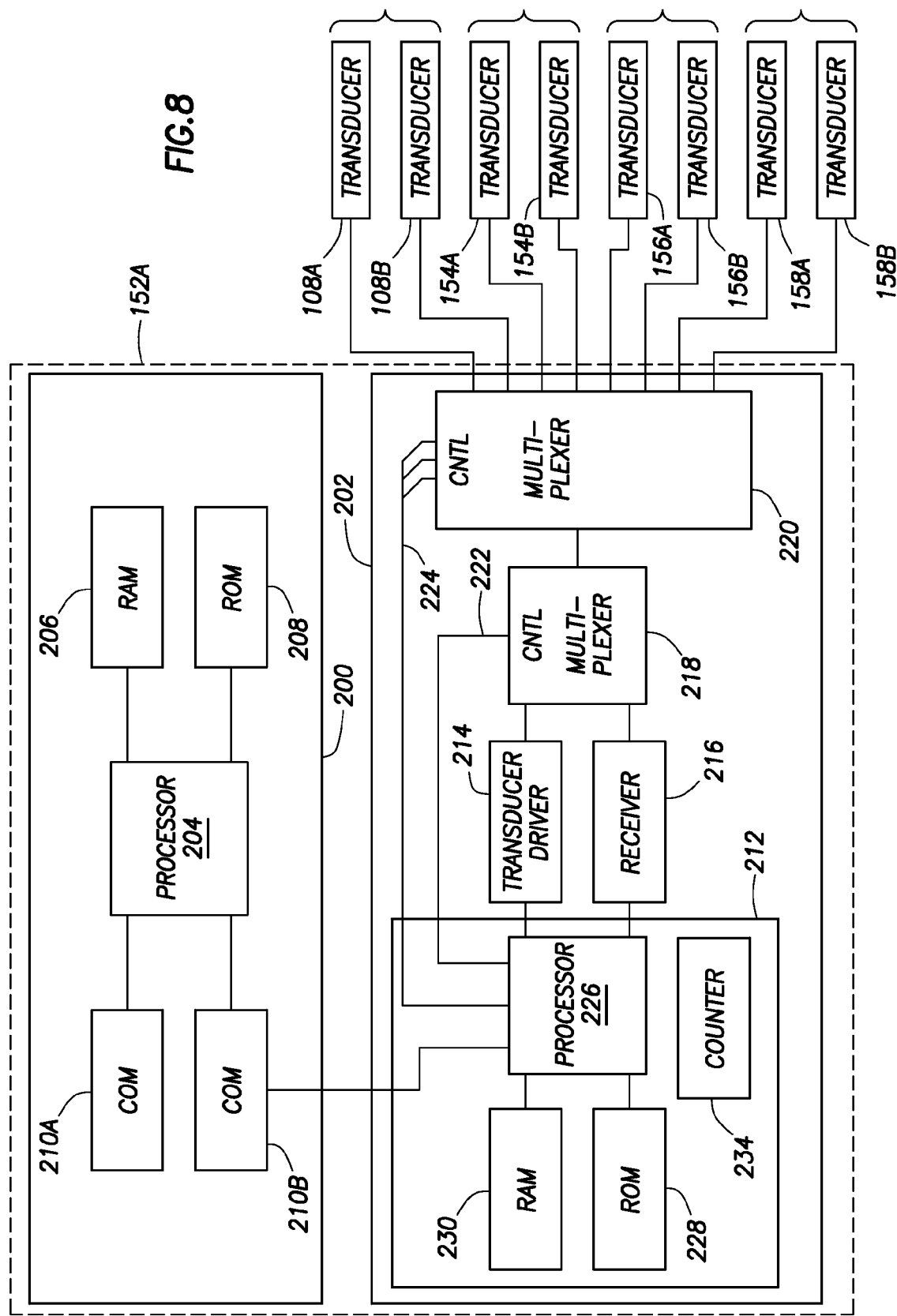
FIG. 8 shows control electronics in accordance with at least some embodiments.

The specification now turns to meter electronics. In accordance with some embodiments, each measurement subsystem has a separate and independent set of control electronics. Returning briefly to FIGS. 3 and 5, the overall meter electronics 152 in those figures is illustrated as two separate control electronics 152A and 152B. FIG. 8 illustrates control electronics 152A associated with a single measurement subsystem in accordance with at least some embodiments. It will be understood, however, that in embodiments where each measurement subsystem has a separate and independent set of control electronics, the description in reference to FIG. 8 is equally applicable to the control electronics for each measurement subsystem. The control electronics 152A may reside within an electronics enclosure, which electronics enclosure may couple to the spool piece 102. Alternatively, the electronics enclosure that houses the control electronics 152A may be equivalently mounted proximate (i.e., within a few feet) of the spool piece. The control electronics 152A in these embodiments comprise a processor board 200 coupled to a data acquisition board 202. The data acquisition board 202, in turn, couples to the transducers for the measurement subsystem. Having a separate processor board 200 and data acquisition board 202 may be based on the data acquisition board 202 being in a location that requires to board 202 to be intrinsically safe (i.e., to reduce the likelihood of sparks or other energy igniting flammable gasses), and the processor board 202 being outside the intrinsically safe area. In other embodiments the functionality of the processor board 200 and the data acquisition board may be incorporated into a single electronics board.

On the processor board 200 resides a processor 204 coupled to a random access memory (RAM) 206, read only memory (ROM) 208 and multiple communication (COM) ports 210A and 210B. The processor 204 is the device within which programs execute to control measurement of fluid flow through the central passage for the particular measurement subsystem. The ROM 208 is a non-volatile memory which stores operating system programs, as well as programs to implement measuring fluid flow. The RAM 206 is the working memory for the processor 204, and before execution some programs and/or data structures may be copied from the ROM 208 to the RAM 206. In alternative embodiments, programs and data structures may be accessed directly from the ROM 208. The communication port 210A is the mechanism by which the meter communicates with other devices, such as the control electronics associated with the other measurement subsystems of the flow meter, flow computers (which may accumulate measured flow volumes from a plurality of flow meters) and/or a data acquisition system. While the processor 204, RAM 206, ROM 208 and communication ports 210 are illustrated as individual devices, in alternative embodiments microcontrollers are used, which microcontrollers integrally comprise a processing core, RAM, ROM and communication ports.

Processor 204 couples to and controls the data acquisition board 204 in order to send and receive acoustic signals through the measured fluid. In particular, the processor 204 couples the data acquisition board through COM port 210B. COM port 210B may be a separate COM port as illustrated, or the processor board 200 may use a single COM port 210 to communicate both to other devices and the data acquisition board 202. In some embodiments, the communication protocol between the processor board 200 and the data acquisition board 202 is RS-485, but other communication protocols may be equivalently used. By way of the illustrative COM port 210B, the processor board 200 sends commands to the data acquisition board 202, such as commands to begin sequential activation of each transducer pair of the measurement subsystem.

Data acquisition board 202 comprises a state machine 212 coupled to a transducer driver 214, receiver 216, and two multiplexers 218 and 220. The state machine 212 also couples to the multiplexers 218 and 220 by way of control lines 222 and 224, respectively. In accordance with at least some embodiments, the state machine 212 is a state machine with a plurality of states that activate each transducer pair of the measurement subsystem in a predefined sequence. The state machine 212 also receives and digitizes acoustic signals incident upon each transducer, and sends the digital representations of the acoustic signals to the processor board 200. In some embodiments, the state machine 212 is implemented as software executing on a processor 226 (e.g., software stored in ROM 228 and executed from RAM 230), and in other embodiments the state machine 212 is an application specific integrated circuit (ASIC) or a field programmable gate array (FPGA).

In some embodiments, the transducer driver 214 comprises an oscillator circuit and an amplifier circuit. In embodiments in which the transducer driver 214 has an internal oscillator, the transducer driver 214 creates an initial signal, amplifies the signal to sufficient signal strength to drive a transducer, and provides impedance matching with respect to the transducers. In other embodiments, the transducer driver 214 receives an alternating current (AC) signal of the desired frequency from the state machine 212 or other source, amplifies the signal and provides impedance matching with respect to the transducers. The receiver 216 likewise may take many forms. In some embodiments, the receiver 216 is an analog-to-digital converter which takes the analog waveform created by a transducer representative of the received acoustic energy, and converts the signal to digital form. In some cases, the receiver 216 filters and/or amplifies the signals prior to or after digitization. The digitized version of the received signal may then pass to the state machine 212, and the digitized version of the received signal is passed to the processor board 200.

The state machine 212 selectively controls the multiplexers 218 and 220 to couple each transducer of each transducer pair to the transducer driver 214 (to drive the transducer to create the acoustic signal) and to the receiver 216 (to receive the electrical signal created by the transducer in response to the acoustic energy). In some embodiments, the state machine 212, within the span of a measurement period (e.g., one second), directs each transducer pair to send approximately 30 upstream acoustic signals and 30 downstream acoustic signals. Greater or fewer sets of upstream and downstream acoustic signals for each transducer pair, and longer or shorter measurement periods, may be equivalently used.

Still referring to FIG. 8, and focusing particularly on transducer pair 108A and 108B as representative of all the transducer pairs. For purposes of this discussion, transducer 108A is the sending transducer, and transducer 108B is the receiving transducer; however, in actual operation these roles change alternately. Under control of the state machine 212, the transducer driver 214 is coupled, through multiplexers 218 and 220, to the transducer 108A. An electrical signal generated and/or amplified by the transducer driver 214 propagates to and excites a piezoelectric element in transducer 108A, and in turn transducer 108A generates an acoustic signal. The acoustic signal traverses the distance between transducer 108A and transducer 108B in the measured fluid. For convenience of the drawing, the transducers 108A and 108B are not aligned, but in operation the pair would be substantially coaxial, as illustrated in FIG. 4. During the flight time of the acoustic signal between transducer 108A and transducer 108B, the state machine 212 changes the configuration of the multiplexers 218 and 220 to couple transducer 108B to the receiver 216. Transducer 108B receives the acoustic energy (i.e., acoustic signal and noise signals), and an electrical signal corresponding to the received acoustic energy propagates to the receiver 216. The roles of transmitter and receiver are thereafter reversed, and the process starts anew on the next transducer pair, such as transducers 154A and 154B.

In some embodiments, the state machine 212 also implements a register or counter 234. The counter comes into play in embodiments (discussed more below) where activation of transducer pairs is based on predetermined time slots. The counter is periodically updated (e.g., every milli-second), and based on the counter the data acquisition board 202 activates transducer pairs in respective time slots. While the counter 234 is shown as part of the state machine 212, in other embodiments the counter may be implemented as a register on the data acquisition board 212 that is periodically updated by the state machine 212 or other hardware. In embodiments where the state machine 212 is implemented as software, the counter 234 may be part of the software, or the counter may be a register of the processor 226.

The state machine 212 sends, to the processor board 200, digital representations of the acoustic signals received and indications of when each acoustic signal was launched. In some cases, the indication of when each signal was launched and the digital representation are combined in the same packet-based message. Based on the information provided from the data acquisition board 202, the processor 204 determines an arrival time each received acoustic signal (e.g., a particular zero crossing of the initial movement), and determines a transit time of the acoustic signal. The process of receiving the information and determining transit times for each firing is repeated over each measurement period (e.g., one second) not only for upstream and downstream firings, but also for each chord of the subsystem. Based on the data determined, flow velocities proximate to each chord are calculated by the processor 204, an average flow velocity is calculated by the processor 204, and based on the spool piece 102 cross-sectional area a flow volume through the meter for the measurement period is calculated by the processor 204.

In some circumstances, the acoustic signals from the first measurement subsystem may interfere with acoustic signals from the second measurement subsystem, causing differences in measured flow. For example, an acoustic signal launched by a first transducer not only propagates across the measured fluid along the chord, but also spreads circularly as the energy travels along the chord, similar to flashlight beam spreading from the focusing mirror. In some cases, because of the width of the beam and the flow of the measured fluid, the acoustic signals launched by a transducer of the first measurement subsystem may impinge upon a transducer of the second measurement subsystem, causing erroneous signals. As another example, while most of the acoustic energy created by a transducer is imparted to the measured fluid, some acoustic energy created by a transducer is coupled to the spool piece 102. The speed of propagation of acoustic signals in the metallic structure of the spool piece 102 is significantly faster, in most cases, than the speed through the measured fluid, and thus parasitic acoustic energy in the spool piece 102 caused by firing of a transducer of the first measurement subsystem may be received by a transducer of the second measurement subsystem, causing erroneous signals.

In order to reduce or eliminate interference between the measurement subsystems, flow meters in accordance with the various embodiments coordinate activation of transducers pairs. The coordination may take many forms and varying levels of sophistication. The discussion of coordination by the measurement subsystems begins with illustrative systems for exchanging synchronization signals, and then turns to the illustrative embodiments of synchronization.

Figure 9:
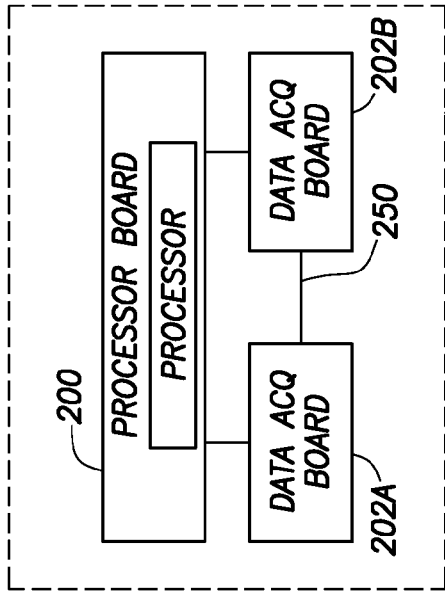
FIG. 9 shows control electronics in accordance with at least some embodiments.
Figure 10:
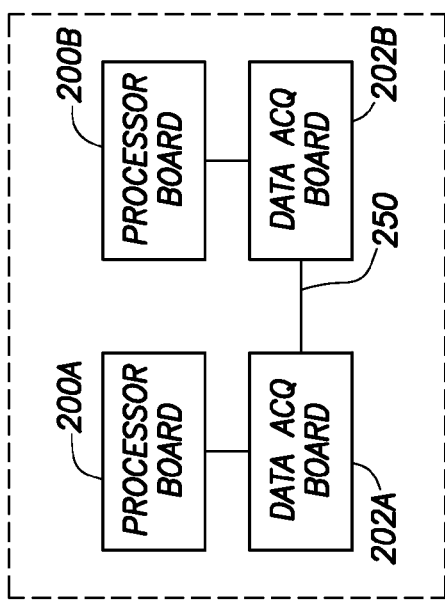
FIG. 10 shows control electronics in accordance with at least some embodiments.

FIG. 9 illustrates control electronics 152 in accordance with at least some embodiments. In particular, the control electronics 152 comprise a processor board 200A and a data acquisition board 202A for a first measurement subsystem, and a processor board 200B and a data acquisition board 202B for a second measurement subsystem. In the embodiments of FIG. 9, a signal line 250 couples between the data acquisition boards 202, and a synchronization signal is exchanged between the data acquisition boards 202 across the signal line 250. FIG. 10 also illustrates embodiments where each measurement subsystem comprises a processor board 200 and a data acquisition board 202; however, in FIG. 10 the synchronization signal is exchanged between the measurement subsystems by way of a signal line 252 coupled between the processor board 200A for the first measurement subsystem and the processor board 200B for the second measurement subsystem.

Figure 11:
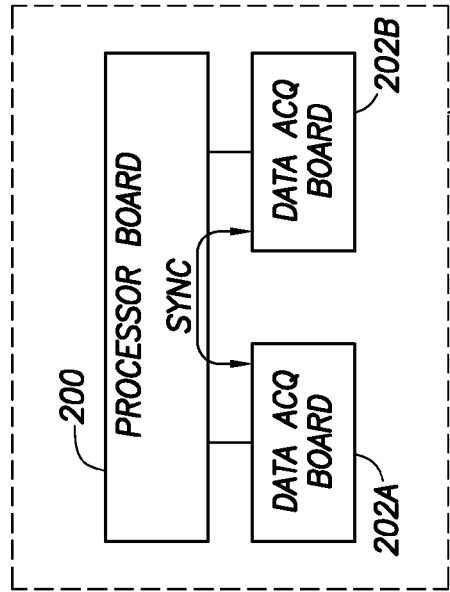
FIG. 11 shows control electronics in accordance with at least some embodiments.
Figure 12:
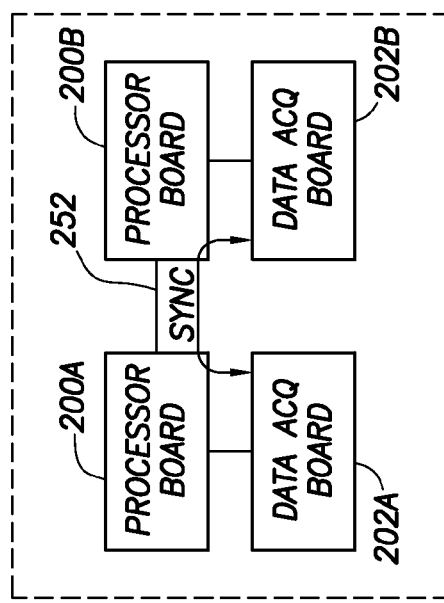
FIG. 12 shows control electronics in accordance with at least some embodiments.

FIG. 11 illustrates embodiments of control electronics 152 where the first measurement subsystem has a data acquisition board 202A, and the second data acquisition board has a data acquisition board 202B, but the control electronics 152 has only one processor board 200 that couples to and controls both data acquisition boards. Nevertheless, in the embodiments of FIG. 11 signal line 250 couples between the data acquisition boards 202, and the synchronization signal is exchanged between the data acquisition boards 202 across the signal line 250. FIG. 12 also illustrates embodiments where each measurement subsystem has a separate data acquisition board 202, but where the control electronics 152 has a single processor board 200 coupled to each data acquisition board 202. However, in the embodiments of FIG. 12 the synchronization signal is exchanged between the data acquisition boards 202 through the processor board 200, and thus a separate signal line between the data acquisition boards 202 is not present.

Figure 14:
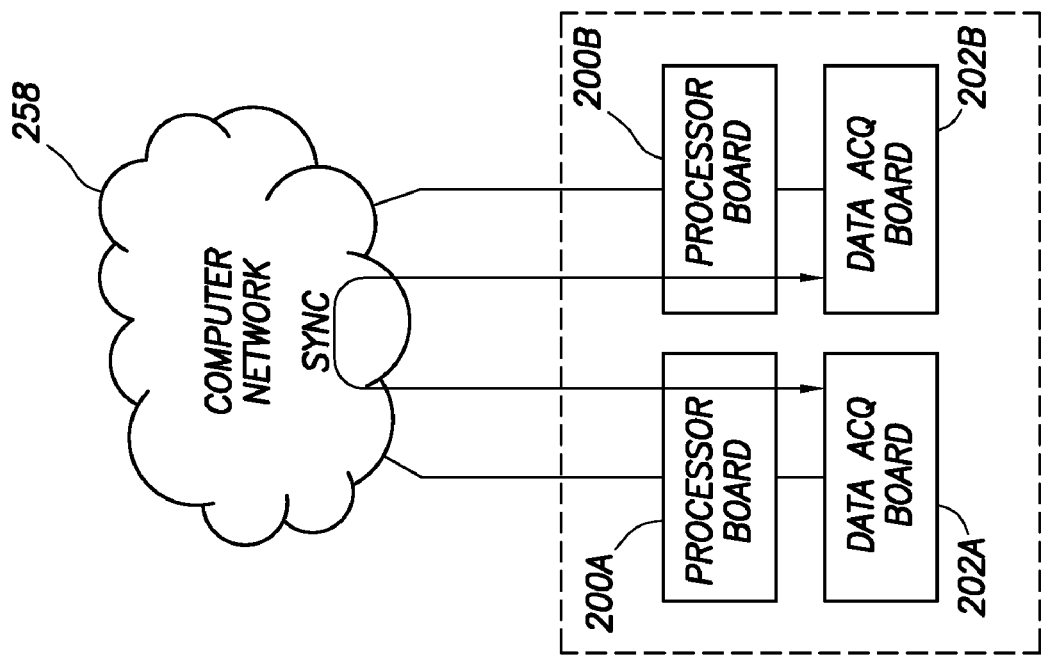
FIG. 14 shows control electronics coupled to a computer network in accordance with at least some embodiments.
Figure 13:
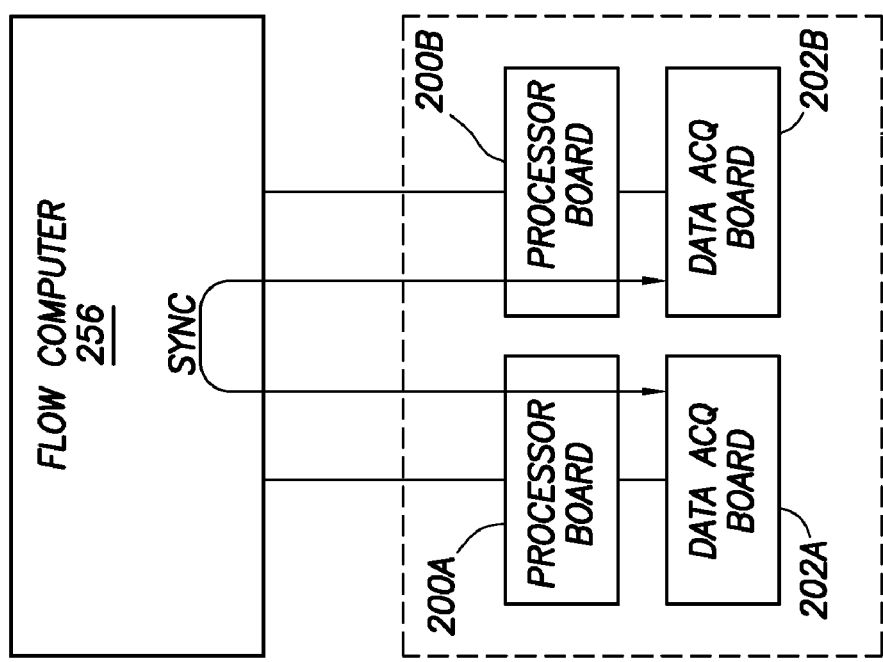
FIG. 13 shows control electronics coupled to a flow computer in accordance with at least some embodiments.

FIG. 13 illustrates embodiments where each measurement subsystem has its own processor board 200 and data acquisition board 202; however, in the embodiments of FIG. 13 the synchronization signal exchanged between the data acquisition boards flows through another device. As illustrated in FIG. 13, the synchronization signal flows through a flow computer 256 coupled to the processor board 200 of each measurement subsystem, but the synchronization signal may flow through any upstream device, such as a supervisory control and data acquisition (SCADA) system. FIG. 14 also illustrates embodiments where each measurement subsystem comprises processor board 200 and data acquisition board 202; however, in FIG. 14 the processor boards 200 are coupled by way of a computer network 258 (e.g., Ethernet Network), and the synchronization signal exchanged between the data acquisition boards flows through the processor boards 200 and the computer network 258.

The specification now turns to illustrative examples of synchronization as between the measurement subsystems. Much like the different physical embodiments for exchange of the synchronization signal, the coordination of activation of transducer pairs as between measurement subsystems may take many forms. For purposes of discussion, the coordination is broken into control by a primary measurement subsystem, and each subsystem firing within predetermined time slots (with time base coordination). Control by a primary measurement subsystem is discussed first.

In some embodiments one of the measurement subsystems is designated as primary, and the remaining measurement subsystem is designated as secondary. The selection of the primary measurement subsystem may be predetermined, or the measurement subsystems may elect among themselves a primary, such as by random number generation or based on a serial number of each subsystem. Regardless of the precise mechanism by which the primary measurement subsystem is selected, the primary measurement subsystem sends a synchronization signal to the secondary measurement subsystem contemporaneously with each activation of a transducer pair of the primary measurement subsystem. The secondary measurement subsystem receives the synchronization signal, and activates a transducer pair of the secondary measurement subsystem responsive to the synchronization signal. In some embodiments, the coordination between the measurement subsystem results in only a single transducer pair being activated at any one time on the flow meter 100. In other embodiments, the coordination may involve having only one transducer launching an acoustic signal at any one time, but launching of one acoustic signal may take place while another acoustic signal is in flight. In yet still other embodiments, the coordination may involve simultaneous firings, but for transducers at different elevations such that interference is not an issue.

FIG. 15 illustrates a timing diagram in accordance with at least some embodiments using a primary/secondary system. In particular, the primary measurement subsystem activates a transducer pair (in this case, launches an acoustic signal by one transducer), as illustrated by block 1500. Contemporaneously with the activation, the first measurement subsystem sends a synchronization signal, as illustrated by block 1502. Sending of the synchronization signal may be by way of any of the mechanisms described above. The second measurement subsystem receives the synchronization signal and activates a transducer pair (in this case, launches an acoustic signal) a predetermined amount of time after receipt of the synchronization signal, as illustrated by time span 1504 and block 1506. In the illustrative case of FIG. 15, the predetermined delay is set such that launching of the acoustic signal of the transducer of the second measurement subsystem is during the flight time of the acoustic signal launched by the first measurement subsystem, as illustrated by the receiving of the acoustic signal for the first measurement subsystem at block 1508. Some time later, the acoustic signal launched by the second measurement subsystem is received, as illustrated by block 1510.

Referring to FIG. 16, in other embodiments the primary measurement subsystem sends the synchronization to more directly control the activation of transducer pairs in the secondary measurement subsystem. In particular, the primary measurement subsystem activates a transducer pair (in this case, launches an acoustic signal) as illustrated by block 1600. Contemporaneously with activation (in particular, between launching and receiving of the acoustic signals), and at the point in time when the primary measurement subsystem desires the secondary measurement subsystem to activate a transducer pair, the primary measurement subsystem sends the synchronization signal. In the case of FIG. 16, the synchronization signal is sent during the flight time of the acoustic signal from the transducer of the first measurement subsystem, as illustrated by block 1602. Sending of the synchronization signal may be by way of any of the mechanisms described above. Based on the command from the primary measurement subsystem, the secondary measurement subsystem immediately activates a transducer pair (in this case launches an acoustic signal), as illustrated by block 1604. Thereafter, the acoustic signal launched by the first measurement subsystem is received (block 1606), and then the acoustic signal launched by the second measurement subsystem is received (block 1608).

In the embodiments of the synchronization described to this point, very little information need be carried by the synchronization signal. In particular, the synchronization signal may be a single Boolean value, and thus signal lines (FIGS. 9 and 11) may be a single wire (with a common ground), or perhaps a two-conductor twisted pair cable. Moreover, if the synchronization signal is delivered through a single or multiple processor boards (FIGS. 10 and 12), again the synchronization signal may be a single Boolean value. In embodiments where the synchronization signal is part of a packet-based message (e.g., FIG. 13 or 14), then the data payload of the message may carry the Boolean value, or the mere fact a message was (regardless of payload, if any) received may represent a synchronization signal.

In the embodiments discussed so far, while the primary measurement subsystem may control timing of the activation of transducer pairs in the secondary measurement subsystem, the primary measurement subsystem does not control which transducer pair of the secondary measurement subsystem is activated. In alternative embodiments, the primary measurement subsystem not only controls the timing, but also which transducer pair the secondary measurement subsystem is to activate. In embodiments where the primary measurement subsystem controls which transducer or transducer pair to activate, the synchronization signal may be more than a single Boolean value, and in fact may comprise a plurality of values to identify which particular transducer or transducer pair to activate (e.g., transducer A1 could be associated with a value 000, transducer A2 could be associated with value 001, and so forth). The plurality of Boolean values may be encoded on the signal lines (FIGS. 9 and 11). Moreover, if the synchronization signal is delivered through a single or multiple processor boards (FIGS. 10 and 12), again the synchronization signal may be a plurality of Boolean values encoded on the signal lines. In embodiments where the synchronization signal is part of a packet-based message (e.g., FIG. 13 or 14), then the data payload of the message may carry the plurality of Boolean values identifying the transducer pair to activate.

The discussion now turns to synchronization based on activation of transducer pairs within predetermined time slots. In particular, in the time slot embodiments each data acquisition board 202 implements a counter 234 (FIG. 8) that is the basis for time determinations. Each transducer or transducer pair is activated based on predetermined time slots ascertained by the time base held in the counter 234. For example, FIG. 17 illustrates a timing diagram for embodiments that fire the transducers based on time slots. FIG. 17 illustrates eight time slots (designated slot 1 through slot 8). Within the first time slot, the first measurement subsystem (having illustratively labeled chords A, B, C and D) launches and receives an acoustic signal along chord A defined by a transducer pair (indicated as A1, block 1700), and likewise the second measurement subsystem (having illustratively labeled chord E, F, G and H) launches and receives an acoustic signal along chord E defined by a transducer pair (indicated as E1, block 1702). Thus, time slot one (or any of the time slots for that matter) are similar to the coordination between measurement subsystems shown with respect to FIG. 15 or 16, except that no synchronization signal is exchanged to specifically identify the activation of the second measurement subsystem. In the next illustrative time slot, time slot two, the first measurement subsystem launches and receives an acoustic signal in the opposite direction along chord A (indicated as A2, block 1704), and likewise the second measurement subsystem launches and receives an acoustic signal in the opposite direction along chord E (indicated as E2, block 1706). The process continues in each time slot and for each transducer pair, ending in time slot eight of illustrative FIG. 17 with launching an acoustic signal along chord D (indicated as D2, block 1708) and along chord H (indicated as H2, block 1710). The timing diagram of FIG. 17 is merely illustrative, and any pattern of activating the transducers within the time slots may be equivalently used.

In the various embodiments based on the time slots, while each data acquisition board 202 has its own counter 234, even if the counters 234 start at the same value at power-up, slight differences in clock frequency may result in misalignment of the time slots as between the measurement subsystems. In order to address such a concern, the embodiments that utilize time slots periodically exchange a synchronization signal. Rather than directly indicating the activation of transducers, the synchronization signal in these embodiments aligns or substantially aligns the counters 234. For example, upon receipt of the synchronization signal, a data acquisition board 234 may set the counter to a predetermined value (e.g., zero). In embodiments where the synchronization signal triggers the counters to a predetermined value, the synchronization signal may be a Boolean value delivered as discussed above, or the signal may be the merely receipt of a synchronization signal as a packet-based message.

In other embodiments, the synchronization signal itself carries an indication of the value to which each counter should be set. For example, the synchronization signal sent along illustrative signal line 250 could comprise a series of Boolean values that directly or indirectly indicate the value to be placed in the counter. In other embodiments, the value to be placed in the counter could be carried as payload in a synchronization signal in the form of a packet-based message.

In the embodiments implemented using time slots, the counters need only be periodically synchronized, with the period set by the accuracy of the clock system associated with the counters. If the clock systems on each data acquisition board stay sufficiently aligned for extended periods of time, then the synchronization signal need only be exchanged every week or every few days. On the other hand, if differences develop quickly between the counters, then a synchronization signal may be exchanged every few hours or few minutes. However, in the various embodiments the clock systems associated with the counters are sufficiently accurate that once aligned a synchronization signal need not be sent more often than a measurement period (e.g., one second). The synchronization signalizes between the measurements subsystems may be sourced by one of the measurement subsystems, or the synchronization signal may come from other sources, such a flow computer or SCADA system coupled to the flow meter.

Figure 18:
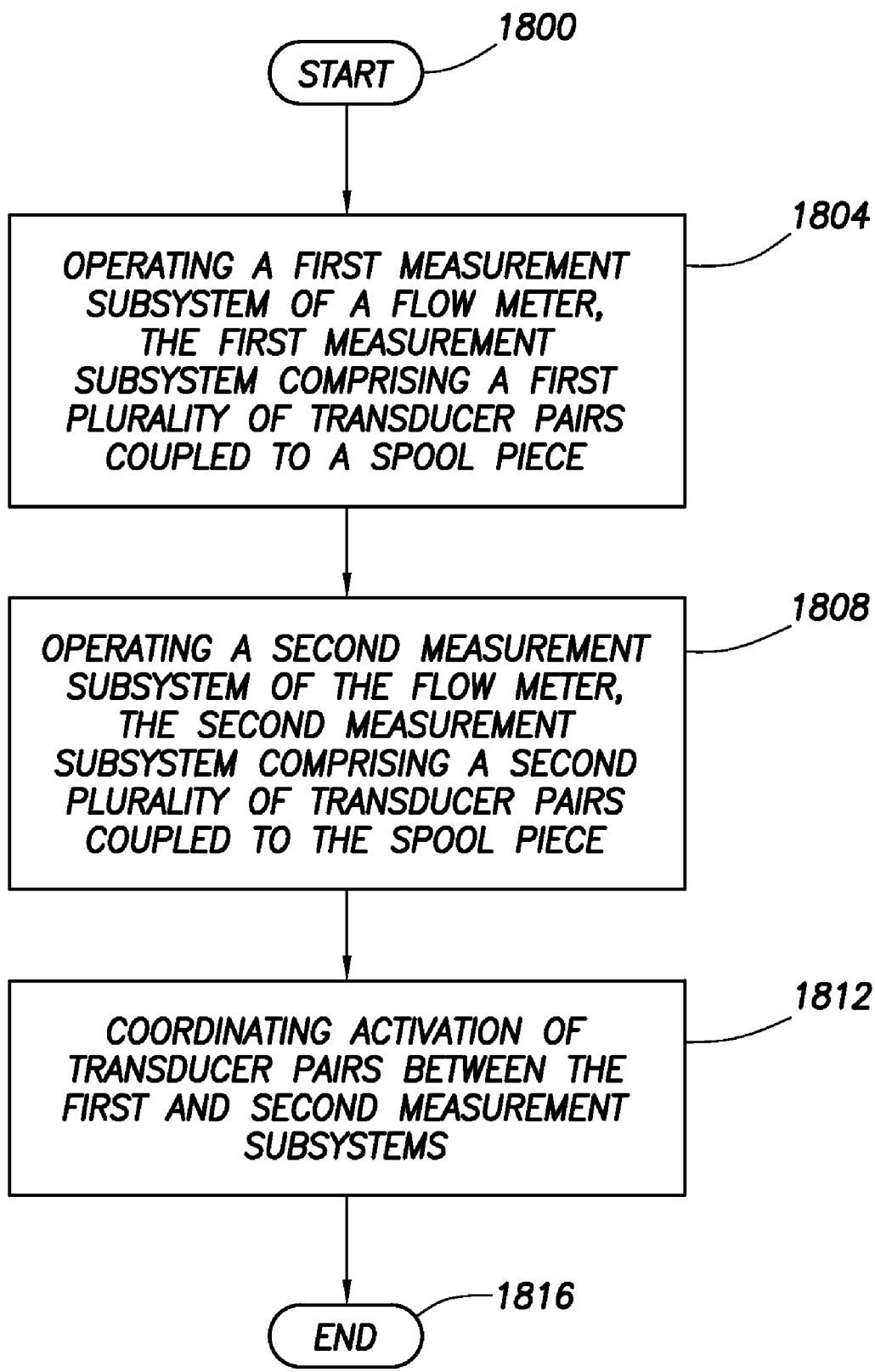
FIG. 18 shows a method in accordance with at least some embodiments.

FIG. 18 illustrates a method in accordance with at least some embodiments. In particular, the method starts (block 1800), and proceeds to operating a first measurement subsystem of a flow meter, the first measurement subsystem comprising a first plurality of transducer pairs coupled to a spool piece (block 1804). The method also comprises operating a second measurement subsystem of the flow meter, the second measurement subsystem comprising a second plurality of transducer pairs coupled to the spool piece (block 1808). Finally, the method comprises coordinating activation of transducer pairs between the first and second measurement subsystems (block 1812), and the method ends (block 1816).

From the description provided herein, those skilled in the art are readily able to combine software created as described with appropriate general-purpose or special-purpose computer hardware to create a flow meter and/or flow measurement subcomponents in accordance with the various embodiments, to create a system or components for carrying out the methods of the various embodiments, and/or to create a computer-readable media storing a software program to implement the method aspects of the various embodiments.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A flow meter comprising:
   a spool piece that defines a central passage;
   a first plurality of transducer pairs mechanically coupled to the spool piece;
   a first control electronics electrically coupled to the first plurality of transducer pairs, the first control electronics configured to selectively activate each transducer pair of the first plurality of transducer pairs;
   a second plurality of transducer pairs mechanically coupled to the spool piece;
   a second control electronics different than the first control electronics, the second control electronics electrically coupled to the second plurality of transducer pairs, the second control electronics configured to selectively activate each transducer pair of the second plurality of transducer pairs;
   the first and second control electronics communicatively coupled and configured to coordinate activation of their respective transducer pairs.

2. The flow meter of claim 1 further comprising:
   the first control electronics comprises:
      a first data acquisition board configured to control activation of the first plurality of transducer pairs;
   the second control electronics comprises:
      a second data acquisition board configured to control activation of the second plurality of transducer pairs;
   the first and second data acquisition boards communicatively coupled by way of a signal line, and the first data acquisition board configured to send, proximate in time to each activation of a transducer pair, a synchronization signal to the second data acquisition board; and
   the second data acquisition board configured to activate a transducer pair based on the synchronization signal.

3. The flow meter of claim 2 further comprising:
   the first acquisition board is configured to send the synchronization signal during the flight of an acoustic signal between a transducer pair of the first plurality of transducer pairs; and
   the second acquisition board is configured to launch an acoustic signal from a transducer of the second plurality of transducer pairs upon receipt of the synchronization signal.

4. The flow meter of claim 3 wherein the first acquisition board is configured to send the synchronization signal that identifies from which transducer the second acquisition board should launch an acoustic signal.

5. The flow meter of claim 2 further comprising:
   the first acquisition board is configured to send the synchronization signal contemporaneously with launch of an acoustic signal from a transducer pair of the first plurality of transducer pairs; and
   the second acquisition board is configured to launch an acoustic signal from a transducer of the second plurality of transducer pairs a predetermined amount of time after receipt of the synchronization signal.

6. The flow meter of claim 5 wherein the first acquisition board is configured to send the synchronization signal that identifies from which transducer the second acquisition board should launch an acoustic signal.

7. The flow meter of claim 2 further comprising:
   the first control electronics further comprises a first processor board comprising a first processor, the first processor board coupled to the first data acquisition board and configured to receive representations of received acoustic signals from the first data acquisition board; and
   the second control electronics further comprises a second processor board comprising a second processor, the second processor board coupled to the second data acquisition board and configured to receive representations of received acoustic signals from the second data acquisition board.

8. The flow meter of claim 2 further comprising a processor coupled to both the first and second data acquisition boards, the processor configured to receive representations of received acoustic signals from both the first and second data acquisition boards.

9. The flow meter of claim 1 further comprising:
   the first control electronics comprises:
      a first data acquisition board configured to control activation of the first plurality of transducer pairs;
      the first data acquisition board configured to activate each transducer pair of the first plurality of transducer pairs in respective predetermined time slots, the time slots determined based on the value of a first counter;
   the second control electronics comprises:
      a second data acquisition board configured to control activation of the second plurality of transducer pairs;
      the second data acquisition board configured to activate each transducer pair of the second plurality of transducer pairs in respective predetermined time slots, the time slots determined based on the value of a second counter;
   the first data acquisition board configured to periodically send a synchronization signal to the second data acquisition board, and the second data acquisition board configured to substantially align the second counter to the first counter based on the synchronization signal.

10. The flow meter of claim 9 wherein when the second control electronics substantially aligns, the second control electronics configured to at least one selected from the group consisting of: set the second counter to a predetermined value; and set the second counter to a value indicated in the synchronization signal.

11. The flow meter of claim 1 further comprising:
the first control electronics comprises:
    a first processor board comprising a first processor;
    a first data acquisition board coupled to the first processor, the first data acquisition board configured to control activation of the first plurality of transducer pairs;
    the first data acquisition board configured to activate each transducer pair of the first plurality of transducer pairs in respective predetermined time slots, the time slots determined based on the value of a first counter;
the second control electronics comprises:
    a second processor board comprising a second processor;
    a second data acquisition board coupled to the second processor configured to control activation of the second plurality of transducer pairs;
    the data acquisition board configured to activate each transducer pair of the second plurality of transducer pairs in respective predetermined time slots, the time slots determined based on the value of a second counter;
the first processor is configured to periodically send a synchronization signal to the second processor, and the second data acquisition board configured to substantially align the second counter to the first counter based on the synchronization signal.

12. The flow meter of claim 11 wherein when the second data acquisition board substantially aligns, the second data acquisition board is configured to at least one selected from the group consisting of: set the second counter to a predetermined value; and set the second counter to a value indicated in the synchronization message.

13. The flow meter of claim 11 wherein when the first processor sends, the first processor is further configured to send the synchronization signal as a packet-based message to the second processor.

14. A method comprising:
    operating a first measurement subsystem of a flow meter, the first measurement subsystem comprising a first plurality of transducer pairs coupled to a spool piece;
    operating a second measurement subsystem of the flow meter, the second measurement subsystem comprising a second plurality of transducer pairs coupled to the spool piece; and
    coordinating activation of transducer pairs between the first and second meter subsystems.

15. The method of claim 14 wherein coordinating further comprises sending a signal between a first control electronics associated with the first measurement subsystem and a second control electronics, different than the first control electronics, associated with the second measurement subsystem.

16. The method of claim 14 wherein coordinating further comprises:
    sending, contemporaneously with each activation of a transducer pair, a Boolean value from the first measurement subsystem to the second measurement subsystem; and
    activating, by the second measurement subsystem, a transducer pair based on receipt of the single Boolean value.

17. The method of claim 16 wherein activating further comprises activating the transducer pair by the second measurement subsystem upon receipt of the single Boolean value.

18. The method of claim 16 wherein activating further comprises activating a predetermined amount of time after receipt of the single Boolean value.

19. The method of claim 14 wherein coordinating further comprises:
    sending, contemporaneously with each activation of a transducer pair, a value indicative of a transducer pair to be fired from the first measurement subsystem to the second measurement subsystem; and
    activating, by the second measurement subsystem, a transducer pair based on receipt of the value.

20. The method of claim 14 further comprising:
    wherein operating the first measurement subsystem further comprises activating each transducer pair of the first measurement subsystem in respective time slots based on a time base maintained by the first measurement subsystem;
    wherein operating the second measurement subsystem further comprises activating each transducer pair of the second measurement subsystem in respective time slots based on a time base maintained by the second measurement subsystem;
    wherein coordinating further comprises;
        sending a synchronization signal from the first measurement subsystem to the second measurement subsystem; and
        aligning the time base maintained by the second measurement subsystem to the time base maintained by the first measurement subsystem based on the synchronization signal.

* * * * *

(12) EX PARTE REEXAMINATION CERTIFICATE (9310th)

United States Patent
Groeschel et al.

(10) Number: US 7,735,380 C1
(45) Certificate Issued: Sep. 18, 2012

(54) METHOD AND SYSTEM OF COORDINATION OF MEASUREMENT SUBSYSTEMS OF A FLOW METER

(75) Inventors: Keith V. Groeschel, Houston, TX (US); Henry Charles Straub, Jr., Sugar Land, TX (US)

(73) Assignee: Daniel Measurement and Control, Inc., Houston, TX (US)

Reexamination Request:
No. 90/011,500, Mar. 8, 2011

Reexamination Certificate for:
Patent No.: 7,735,380
Issued: Jun. 15, 2010
Appl. No.: 12/169,678
Filed: Jul. 9, 2008

(51) Int. Cl.
*G01F 1/66* (2006.01)

(52) U.S. Cl. ............... 73/861.27; 73/861.29; 73/861.04; 73/861.28

(58) Field of Classification Search ............. 73/861
See application file for complete search history.

(56) References Cited

To view the complete listing of prior art documents cited during the proceeding for Reexamination Control Number 90/011,500, please refer to the USPTO's public Patent Application Information Retrieval (PAIR) system under the Display References tab.

*Primary Examiner* — Anjan K Deb

(57) ABSTRACT

Coordination of measurement subsystems of a flow meter. At least some of the illustrative embodiments are flow meters comprising a spool piece that defines a central passage, a first plurality of transducer pairs mechanically coupled to the spool piece, a first control electronics electrically coupled to the first plurality of transducer pairs (the first control electronics configured to selectively activate each transducer pair of the first plurality of transducer pairs), a second plurality of transducer pairs mechanically coupled to the spool piece, a second control electronics different than the first control electronics (the second control electronics electrically coupled to the second plurality of transducer pairs, the second control electronics configured to selectively activate each transducer pair of the second plurality of transducer pairs). The first and second control electronics communicatively coupled and configured to coordinate activation of their respective transducer pairs.

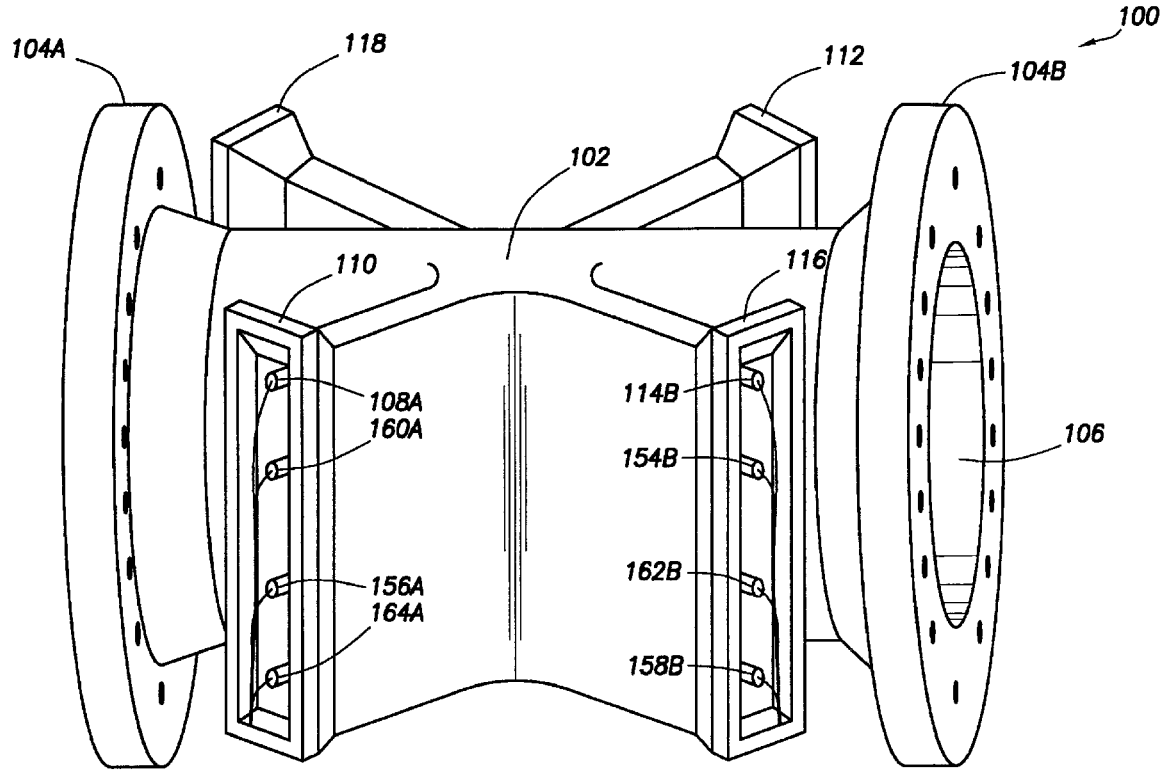

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 14-20 is confirmed.

Claims 1-6, 9 and 11 are determined to be patentable as amended.

Claims 7, 8, 10 and 12-14, dependent on an amended claim, are determined to be patentable as amended.

1. A flow meter comprising:
a spool piece that defines a central passage;
a first plurality of transducer pairs mechanically coupled to the spool piece;
a first control electronics electrically coupled to the first plurality of transducer pairs, the first control electronics configured to selectively activate each transducer pair of the first plurality of transducer pairs;
a second plurality of transducer pairs mechanically coupled to the spool piece;
a second control electronics different than the first control electronics, the second control electronics electrically coupled to the second plurality of transducer pairs, the second control electronics configured to selectively activate each transducer pair of the second plurality of transducer pairs;
the first and second control electronics communicatively coupled and configured to coordinate *between the first and second control electronics* activation of their respective transducer pairs.

2. [The flow meter of claim 1 further comprising:
the first control electronics comprises:] *A flow meter comprising:*
*a spool piece that defines a central passage;*
*a first plurality of transducer pairs mechanically coupled to the spool piece;*
*a second plurality of transducer pairs mechanically coupled to the spool piece;*
*a first control electronics electrically coupled to the first plurality of transducer pairs, the first control electronics comprising*
a first data acquision board configured to control activation of the first plurality of transducer pairs;
[The second control electronics comprises:] *a second control electronics different than the first control electronics, the second control electronics electrically coupled to the second plurality of transducer pairs, the second control electronics comprising* a second data acquisition board configured to control activation of the second plurality of transducer pairs;
the first and second data acquisition boards communicatively coupled by way of a signal line, and the first data acquisition board configured to send, proximate in time to each activation of a transducer pair, a synchronization signal to the second data acquisition board; and
the second data acquisition board configured to activate a transducer pair based on the synchronization signal.

3. The flow meter of claim 2 further comprising:
the first *data* acquisition board is configured to send the synchronization signal during the flight of an acoustic signal between a transducer pair of the first plurality of transducer pairs; and
the second *data* acquisition board is configured to launch an acoustic signal from a transducer of the second plurality of transducer pairs upon receipt of the synchronization signal.

4. The flow meter of claim 3 wherein the first *data* acquisition board is configured to send the synchronization signal that identifies from which transducer the second acquisition board should launch an acoustic signal.

5. The flow meter of claim 2 further comprising:
the first *data* acquisition board is configured to send the synchronization signal contemporaneously with launch of an acoustic signal from a transducer pair of the first plurality of transducer pairs; and
the second *data* acqustion board is configured to launch an acoustic signal from a transducer of the second plurality of transducer pairs a predetermined amount of time after receipt of the synchronization signal.

6. The flow meter of claim 5 wherein the first *data* acquisition board is configured to send the synchronization signal that identifies from which transducer the second *data* acquisition board should launch an acoustic signal.

9. [The flow meter of claim 1 further comprising:
the first control electronics comprises:] *A flow meter comprising:*
*a spool piece that defines a central passage;*
*a first plurality of transducer pairs mechanically coupled to the spool piece;*
*a second plurality of transducer pairs mechanically coupled to the spool piece;*
*a first control electronics electrically coupled to the first plurality of transducer pairs, the first control electronics comprising*
a first data acquisition board configured to control activation of the first plurality of transducer pairs;
the first data acquisition board configured to activate each transducer pair of the first plurality of transducer pairs in respective predetermined time slots, the time slots determined based on the value of a first counter;
[the second control electronics comprises:] *a second control electronics different than the first control electronics, the second control electronics electrically coupled to the second plurality of transducer pairs, the second control electronics comprising*
a second data acquisition board configured to control activation of the second plurality of transducer pairs;
the second data acquisition board configured to activate each transducer pair of the second plurality of transducer pairs in respective predetermined time slots, the time slots determined based on the value of a second counter;
the first data acquisition board configured to periodically send a synchronization signal to the second data acquisition board, and the second data acquisition board configured to substantially align the second counter to the first counter based on the synchronization signal.

11. [The flow meter of claim 1 further comprising:
the first control electronics comprises:] *A flow meter comprising:*

*a spool piece that defines a central passage;*

*a first plurality of transducer pairs mechanically coupled to the spool piece;*

*a second plurality of transducer pairs mechanically coupled to the spool piece;*

*a first control electronics electrically coupled to the first plurality of transducer pairs, the first control electronics comprising* a first processor board comprising a first processor;

a first data acquisition board coupled to the first processor, the first data acquisition board configured to control activation of the first plurality of transducer pairs;

the first data acquisition board configured to activate each transducer pair of the first plurality of transducer pairs in respective predetermined time slots, the time slots determined based on the value of a first counter;

[the second control electronics comprises:] *a second control electronics different than the first control electronics, the second control electronics electrically coupled to the second plurality of transducer pairs, the second control electronics comprising* a second processor board comprising a second processor;

a second data acquisition board coupled to the second processor configured to control activation of the second plurality of transducer pairs;

the *second* data acquisition board configured to activate each transducer pair of the second plurality of transducer pairs in respective predetermined time slots, the time slots determined based on the value of a second counter;

the first processor is configured to periodically send a synchronization signal to the second processor, and the second data acquisition board configured to substantially align the second counter to the first counter based on the synchronization signal.

\* \* \* \* \*